US012583697B2

(12) United States Patent　　(10) Patent No.:　US 12,583,697 B2

Imazu et al.　　(45) Date of Patent:　Mar. 24, 2026

(54) SOFT TUBE AND METHOD FOR MANUFACTURING THE SAME, AND SHEET CONVEYING ROLLER AND METHOD FOR MANUFACTURING THE SAME

(71) Applicant: Konica Minolta, Inc., Tokyo (JP)

(72) Inventors: Yoshifumi Imazu, Hachioji (JP); Hajime Mori, Fuchu (JP)

(73) Assignee: KONICA MINOLTA, INC., Tokyo (JP)

( * ) Notice: Subject to any disclaimer, the term of this patent is extended or adjusted under 35 U.S.C. 154(b) by 375 days.

(21) Appl. No.: 17/533,245

(22) Filed: Nov. 23, 2021

(65) Prior Publication Data

US 2022/0169461 A1　　Jun. 2, 2022

(30) Foreign Application Priority Data

Nov. 27, 2020　(JP) ................................. 2020-197164

(51) Int. Cl.
| | |
|---|---|
| *B65H 5/06* | (2006.01) |
| *B29C 65/00* | (2006.01) |
| *B29C 65/02* | (2006.01) |
| *B29D 23/00* | (2006.01) |
| *B29K 21/00* | (2006.01) |
| *B29L 31/32* | (2006.01) |

(52) U.S. Cl.
CPC .............. *B65H 5/06* (2013.01); *B29C 65/02* (2013.01); *B29C 66/612* (2013.01); *B29D 23/00* (2013.01); *B29K 2021/003* (2013.01); *B29L 2031/32* (2013.01); *B65H 2404/111* (2013.01); *Y10T 29/49547* (2015.01); *Y10T 29/4956* (2015.01)

(58) Field of Classification Search
CPC ....... B65H 5/06; B65H 3/06; Y10T 29/49544; Y10T 29/49547; Y10T 29/49549; Y10T 29/4956
See application file for complete search history.

(56) References Cited

U.S. PATENT DOCUMENTS

| | | | | | |
|---|---|---|---|---|---|
| 6,305,859 | B2 * | 10/2001 | Shida | ....................... | B41J 13/02 |
| | | | | | 400/636 |
| 8,561,536 | B2 * | 10/2013 | MacFarlane | ............. | B41N 7/06 |
| | | | | | 101/352.13 |
| 10,345,735 | B2 * | 7/2019 | Nojiri | ................ | G03G 15/0818 |
| 2002/0115545 | A1 * | 8/2002 | Yoshida | ................. | B65H 27/00 |
| | | | | | 492/30 |

(Continued)

FOREIGN PATENT DOCUMENTS

| | | | |
|---|---|---|---|
| CN | 102566371 | A * | 7/2012 |
| JP | H01113216 | A | 5/1989 |

(Continued)

OTHER PUBLICATIONS

English Machine Translation JP-2009122316-A (Year: 2009).*

(Continued)

*Primary Examiner* — Sarang Afzali

(74) *Attorney, Agent, or Firm* — CANTOR COLBURN LLP

(57) ABSTRACT

Disclosed is a soft tube of a sheet conveying portion of a sheet conveying roller, including: a region with irregularities in an outer peripheral surface of the soft tube. The region has a root mean square slope Sdq within a range of 0.03 to 0.50.

9 Claims, 4 Drawing Sheets

(56) References Cited

U.S. PATENT DOCUMENTS

2007/0066468 A1 * 3/2007 Kim .................. G03G 15/1685
29/895.32

FOREIGN PATENT DOCUMENTS

| | | | |
|---|---|---|---|
| JP | 2851799 | B2 * | 1/1999 |
| JP | 2002120944 | A | 4/2002 |
| JP | 3707706 | B2 | 10/2005 |
| JP | 3813480 | B2 | 8/2006 |
| JP | 2009122316 | A * | 6/2009 |
| JP | 5206935 | B2 * | 6/2013 |
| JP | 2016097645 | A | 5/2016 |

OTHER PUBLICATIONS

English Machine Translation CN-102566371-A (Year: 2012).*
Coi Rubber Products Durometer Conversion Chart (Year: 2018).*
Hoto Instruments, How to use a Durometer (Year: 2020).*
English Machine Translation JP-5206935-B2 (Year: 2013).*
English Machine Translation of JP2851799B2 (Year: 1999).*
JPO Notice of Reasons for Refusal for corresponding JP Application No. 2020-197164; Issued Apr. 23, 2024.
JPO Decision of Refusal for corresponding JP Application No. 2020-197164; Issued Aug. 20, 2024.

* cited by examiner

FIG.2
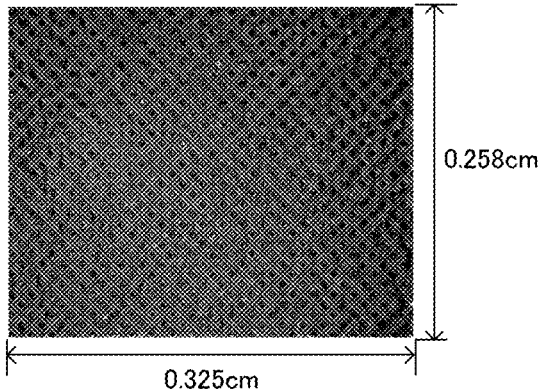
FIG.3A
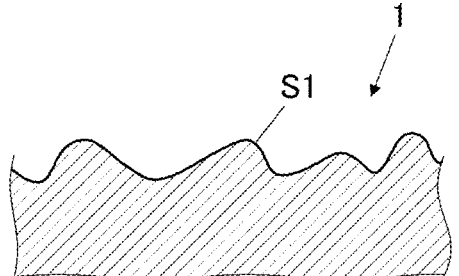
FIG.3B

SOFT TUBE AND METHOD FOR MANUFACTURING THE SAME, AND SHEET CONVEYING ROLLER AND METHOD FOR MANUFACTURING THE SAME

CROSS-REFERENCE TO RELATED APPLICATIONS

The present invention claims priority under 35 U.S.C. § 119 to Japanese Patent Application No. 2020-197164 filed on Nov. 27, 2020, the entire content of which is incorporated herein by reference.

BACKGROUND

Technological Field

The present invention relates to a soft tube and a method for manufacturing the same, and a sheet conveying roller and a method for manufacturing the same. More specifically, the present invention relates to a soft tube that has irregularities on the outer peripheral surface and that is used as a sheet conveying member, in which the irregularities have been less scraped off during the manufacture thereof, the manufacturing method thereof, and a sheet conveying roller using the soft tube and the manufacturing method thereof.

Description of Related Art

A sheet conveying roller of a multifunction peripheral (MFP) such as a multifunction printer is composed of a combination of a rotatable shaft and a tube-shaped sheet conveying portion disposed on the outer peripheral surface of the shaft. For the sheet conveying portion, a rubber-elastic soft material such as ethylene propylene rubber, urethane rubber, or thermoplastic elastomer is used so that it can grip and convey sheets such as paper. The sheet conveying portion is often shaped by extrusion molding or injection molding.

However, when paper is conveyed using such a sheet conveying roller, for example, paper dust produced from the conveyed paper adheres to the sheet conveying portion. When the paper dust comes into contact with the paper again, the sheet conveying portion may slip and spin or the paper dust adhere to the printed paper again, leaving traces of the paper dust. The sheet conveying roller has such drawbacks. As a measure to avoid the drawbacks, known is a method of providing knurled grooves in the length direction of the shaft on the outer peripheral surface of the sheet conveying portion by extrusion molding so that paper dust adheres less to the sheet conveying portion (see, for example, Japanese Patent No. 3813480).

The mechanism is to prevent the paper dust from adhering to the surface of the sheet conveying portion by allowing paper dust to escape to the recesses (grooves) during the sheet conveyance. However, when the knurled grooves are provided on the outer peripheral surface of the sheet conveying portion, the sheet conveyance may be affected by the shape of irregularities formed by the knurled grooves. For example, when the irregularities by the knurled grooves are sparse, the surface pressure between the sheet conveying portion and the sheet becomes intermittent, which results in the uneven grip. The narrower distance between the knurled grooves would improve the sheet conveyance performance. However, a problem is that the projected portions strongly contact the sheet and may form a mark of the projected portions on the sheet.

As a proposal to solve the problem, Japanese Patent No. 3707706 describes method of preventing adhesion of paper dust to the sheet conveying portion and securing the sheet conveyance performance, in which a wrinkle pattern having a surface roughness Ra of 30 to 80 μm is formed on the outer peripheral surface of the sheet conveying portion that is made of rubber or thermoplastic elastomer having a hardness of 10 to 30° on the Shore A scale. In Japanese Patent No. 3707706, a molding method using a mold such as press molding (compression molding) or injection molding is employed in order to form the above-mentioned wrinkle pattern on the outer peripheral surface of the sheet conveying portion.

SUMMARY

However, when a soft tube having irregularities on the outer peripheral surface is formed by using the irregularities of the mold, releasing the soft tube from the mold by pushing or pulling the soft tube in the axial direction (length direction) thereof suffers from undercuts. A problem with the undercuts is that so-called "irregularity scraping" readily occurs, in which the irregularities of the outer peripheral surface of the soft tube are scraped off by the irregularities of the mold. When the soft tube is made of a rubber elastic body having a low hardness such as 10 to 30° on the Shore A scale, the mold sticks stronger to the mold due to the increased tackiness. Then, the irregularities are more likely to be scraped off at the time of mold release.

When the mold is configured to release the molded product in the radial direction, less portions become undercuts. However, since undercuts remain around a parting portion, this cannot be a radical improvement to the irregularity scraping. In addition, a step or bump is formed at the parting portion due to a machining error between a movable mold half and a fixed mold half, which causes another problem of the occurrence of a noise during sheet conveyance or a damage on a sheet.

The present invention has been made in view of the above problems and situations, and an object thereof is to provide a soft tube that has irregularities on the outer peripheral surface and that is used as a sheet conveying member, in which irregularity scraping in the manufacture thereof is reduced, a method for manufacturing the same, a sheet conveying roller using the soft tube, and a method for manufacturing the same.

In order to solve the above problems, the present inventors found, in the process of examining the cause of the above problems, that the irregularity scraping is reduced when the outer peripheral surface with the irregularities of the soft tube have a root mean square slope Sdq within the range of 0.03 to 0.50. The present invention has thus been made. That is, the above-described problems relating to the present invention is solved by the following means.

To achieve at least one of the abovementioned objects, according to an aspect of the present invention, a soft tube of a sheet conveying portion of a sheet conveying roller reflecting one aspect of the present invention comprises: a region with irregularities in an outer peripheral surface of the soft tube, the region having a root mean square slope Sdq within the range of 0.03 to 0.50.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein:

FIG. 2 is a perspective view of an example embodiment of the sheet conveying roller of the present invention;

FIG. 3A is a photograph (×18 magnification) of the outer peripheral surface of the example embodiment of the soft tube of the present invention;

FIG. 3B is an enlarged cross-sectional view of the example embodiment of the soft tube of the present invention, illustrating the outer peripheral surface and the vicinity thereof;

DETAILED DESCRIPTION OF EMBODIMENTS

Figure 1A:
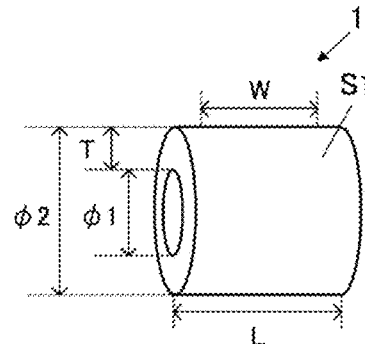
FIG. 1A is a perspective view of an example embodiment of the soft tube of the present invention.

By the present disclosure, it is possible to provide a soft tube that has irregularities on the outer peripheral surface and that is used as a sheet conveying member, in which irregularity scraping in the manufacture thereof is reduced, a method for manufacturing the same, a sheet conveying roller using the soft tube, and a method for manufacturing the same. The mechanism of how the advantageous effects of the present disclosure are developed or work is presumed as follows.

The soft tube of the present disclosure has a region with irregularities on the outer peripheral surface, in which the region has a root mean square slope Sdq in the range of 0.03 to 0.50. Hereinafter, the region with the irregularities is also referred to as an "irregular region". The root mean square slope Sdq (hereinafter, also simply referred to as "Sdq") is a parameter calculated from the root mean square of the slopes at all points in a defined region. Specifically, the root mean square slope Sdq is calculated by the following equation (I). Sdq corresponds to a parameter obtained by extending the root mean square slope Rdq (specified in JIS B0601) of a roughness curve to a surface, which is a parameter specified in ISO25178.

$$Sdq = \sqrt{\frac{1}{A}\iint_A \left[\left(\frac{\partial z(x, y)}{\partial x}\right)^2 + \left(\frac{\partial z(x, y)}{\partial y}\right)^2\right]dxdy} \qquad \text{Equation (I)}$$

The symbols in the equation (I) have the following meanings.

A: Area of the measured region $\partial z(x, y)/\partial x$: Slope of points adjacent in the X direction $\partial z(x, y)/\partial z$: Slope of points adjacent in the Y direction The present inventors focused on Sdq among various parameters representing the irregularities on the outer peripheral surface, and have found that by adjusting the Sdq, it is possible to achieve both sheet conveyance performance and less irregularity scraping in the manufacture. When the soft tube has an Sdq of 0.03 or more in the irregular region in the outer peripheral surface, it is possible to achieve the sheet conveyance performance that is practically acceptable when the soft tube is used for a sheet conveying roller. When the soft tube has an Sdq of 0.50 or less in the irregular region in the outer peripheral surface, it is possible to reduce irregularity scraping in the manufacture of the soft tube.

The soft tube of the present disclosure is used for the sheet conveying portion of a sheet conveying roller, and has a region with irregularities on the outer peripheral surface in which the root mean square slope Sdq is in the range of 0.03 to 0.50.

Sdq can be measured using, for example, a three-dimensional white light interferometry microscope (WYKO (Bruker Japan)). Specifically, five measurement areas each having a size of 2.3 mm×1.7 mm are randomly selected in the irregular region. Position coordinates (x, y, z) are measured at a pitch of 0.5 μm using the above measuring device in each measurement area. At each measurement point where the position coordinates are measured, the slopes to an adjacent point in the X direction and to an adjacent point in the Y direction are calculated.

In each of the five random measurement areas, the values obtained at the measurement points are substituted into the equation (I) to calculate the Sdq in each measurement area, and the average Sdq in the five measurement areas is calculated as the Sdq of the irregular region.

In an embodiment of the soft tube of the present invention, it is preferable that the arithmetic mean height Sa of the region with irregularities in the outer peripheral surface is within the range of 3.4 to 50.0 The arithmetic mean height Sa (hereinafter, simply referred to as "Sa") is a parameter calculated from the absolute values of the height with respect to the average plane at all points in an defined area. Specifically, Sa is calculated by the following equation (II). Sa corresponds to a parameter obtained by extending the arithmetic mean height Ra (defined in JIS B0601) of a roughness curve to a surface, which is defined in ISO25178.

$$Sa = \frac{1}{A}\int\int_A |Z(x, y)|\,dxdy \qquad \text{Equation (II)}$$

The symbols in equation (II) have the following meanings.

A: Area of the measured region $|Z(x, y)|$: Absolute value of height with respect to the average plane Sa is measured, for example, at the same five measurement areas in the irregular region as those for the Sdq measurement, using the same measuring device as described above. First, the position coordinates (x, y, z) are measured at a pitch of 0.5 μm in a selected measurement area, and the height of the average plane in the measurement area is calculated. Next, the absolute value of the height with respect to the average plane at each measurement point where the position coordinate is measured is obtained, and the obtained values are substituted into the equation (II) to obtain Sa. Further, the average Sa in the five measurement areas is calculated as the Sa of the irregular region.

When the Sa of the irregular region in the outer peripheral surface of the soft tube is 3.4 μm or more, the soft tube exhibits good sheet conveyance performance, and it is possible to reduce adhesion of paper dust and the like to the soft tube. Such paper dust is produced during sheet convey-ance. When the soft tube has an Sa of 50 μm or less in the irregular region in the outer peripheral surface, it is possible to further reduce the irregularity scraping in the manufacture of the soft tube.

In an embodiment of the soft tube of the present disclo-sure, from the viewpoint of obtaining the advantageous effects of the present invention, the shore A hardness of the soft tube at 25° C. is preferably in the range of 40 to 85, and the irregularities have preferably a random shape. The Shore A hardness can be measured by a method according to JIS Z2246. Hereinafter, in the present specification, unless oth-erwise specified, shore A hardness is measured at 25° C. by the method in accordance with JIS Z2246.

In an embodiment of the soft tube of the present inven-tion, it is preferable that there is no parting line on the outer peripheral surface from the viewpoint of obtaining the advantageous effects of the present invention. A parting line refers to a line-shaped step or burr that is formed on a product along the joint (parting portion) of the mold. The details of the parting line will be described later.

In an embodiment of the soft tube of the present disclo-sure, it is preferable that the soft tube contains a thermo-plastic elastomer as the constituent material from the view-point of obtaining the advantageous effects of the present invention.

The method for manufacturing a soft tube of the present disclosure is a method for manufacturing the above-de-scribed soft tube of the present disclosure, and involves molding the soft tube by injection molding or compression molding. This is because injection molding or compression molding allows production at good productivity and low cost. Further, when the irregularities of the outer peripheral surface have an Sdq of 0.03 to 0.50, it is possible to reduce the problematic irregularity scraping.

The sheet conveying roller of the present invention includes a shaft and a tubular sheet conveying portion disposed on the outer peripheral surface of the shaft, and the sheet conveying portion includes the soft tube of the present disclosure.

In an embodiment of the sheet conveying roller of the present disclosure, the difference in solubility parameter SP between the constituent material of the soft tube and the constituent material of the shaft is preferably 1 $(cal/cm^3)^{1/2}$ or less from the viewpoint of improving the adhesion between the soft tube and the shaft. As used herein, SP is a theoretical value calculated by the method according to Fedors (Polym. Eng. Sci. 14 (2) 152, (1974)).

The method for manufacturing the sheet conveying roller of the present disclosure involves: molding the soft tube; inserting the soft tube to a holding portion of a mold, the mold having the holding portion for holding the soft tube and a molding portion for molding a shaft such that the shaft is in contact with the inner peripheral surface of the soft tube; and molding the shaft in the molding portion of the mold.

In an embodiment of the method for manufacturing a sheet conveying roller of the present disclosure, from the viewpoint of improving the adhesion between the soft tube and the shaft, the molding of the shaft involves joining the inner peripheral surface of the soft tube and the outer peripheral surface of the shaft to each other by melt joining.

Hereinafter, the present invention and the components thereof, as well as the configurations and the embodiments to carry out the invention, will be described in detail referring to the drawings. However, the scope of the present invention is not limited to the illustrated examples. Suitable changes can be made in the soft tube and sheet conveying roller of the illustrated example without departing from the features of the present invention. In the present description, when two figures are used to indicate a range of value before and after "to", these figures are included in the range as the lowest limit value and the upper limit value.

(Soft Tube)

The soft tube of the present disclosure is used for the sheet conveying portion of a sheet conveying roller, and has a region with irregularities on the outer peripheral surface in which the root mean square slope Sdq is in the range of 0.03 to 0.50.

The soft tube of the present invention is made of a soft material. The soft material is, for example, a material having an elongation (elongation rate) of 100% or more measured in accordance with JIS K6251. The soft material preferably has rubber elasticity, which is distorted when subjected to stress but restores to substantially the original dimensions in a short time when released from the stress.

Figure 1B:
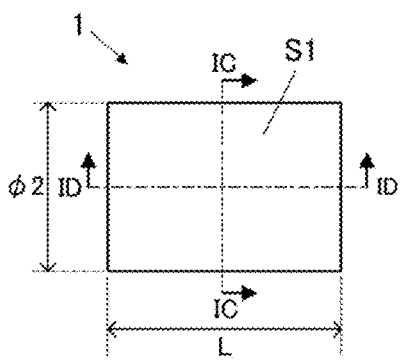
FIG. 1B is a plan view of the soft tube of FIG. 1A.
Figure 1C:
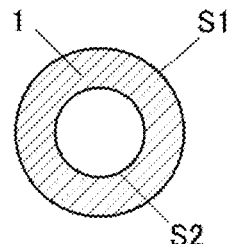
FIG. 1C is a cross-sectional view of the soft tube of FIG. 1A taken along the line IC-IC in FIG. 1B.
Figure 1D:
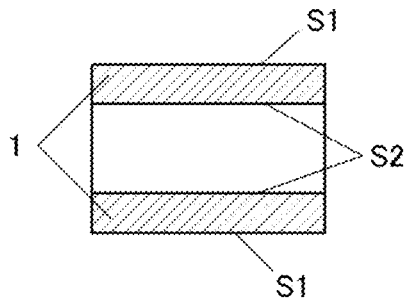
FIG. 1D is a cross-sectional view of the soft tube of FIG. 1A taken along the line ID-ID in FIG. 1B.

FIG. 1A is a perspective view of the soft tube 1, which is an example embodiment of the soft tube of the present disclosure. FIG. 1B is a plan view of the soft tube 1 of FIG. 1A. FIG. 1C and FIG. 1D are cross-sectional views of the soft tube 1 taken along respectively IC-IC and ID-ID in the plan view. FIG. 2 is a perspective view of an example embodiment of the sheet conveying roller of the present disclosure. The sheet conveying roller 10 in FIG. 2 includes a shaft 2 and a soft tube 1 illustrated in FIG. 1A to FIG. 1D. The soft tube 1 is a tube-shaped sheet conveying portion disposed on the outer peripheral surface S3 of the shaft 2. FIG. 3A is a photograph (×18 magnification) of the outer peripheral surface of an example embodiment of the soft tube of the present invention. FIG. 3B is an enlarged cross-sectional view of the example embodiment of the soft tube of the present invention, illustrating the outer peripheral surface and the vicinity thereof.

The soft tube 1 in FIG. 1A to FIG. 1D is a tube body made of a soft material having an inner diameter of φ1, an outer diameter of φ2, and a length of L. The soft tube 1 is used as a sheet conveying portion of the sheet conveying roller. As an example of the sheet conveying roller in which the soft tube 1 is used, a sheet conveying roller 10 illustrated in FIG. 2 can be given. Further, FIG. 2 schematically illustrates a mechanism in which the sheet conveying roller 10 conveys a sheet P.

The sheet conveying roller 10 is configured such that, for example, a shaft 2 rotates in the circumferential direction, i.e. the RD direction in FIG. 2, and the soft tube 1 rotates accordingly in the same direction. By the rotation, the sheet P disposed in contact with the outer peripheral surface S1 of the soft tube 1 is gripped and conveyed in the PD direction in FIG. 2. Specifically, for example, the sheet P is conveyed by being nipped between the soft tube 1 of the sheet conveying roller 10 and a cylindrical roller (not shown in the figure) oppositely in contact with the soft tube 1 and passing through between the soft tube 1 and the roller.

The outer peripheral surface S1 of the soft tube 1 is configured to come into contact with the sheet to be conveyed. The outer peripheral surface S1 includes an irregular region having an Sdq in the range of 0.03 to 0.50. Hereinafter, the irregular region having an Sdq in the range of 0.03 to 0.50 is also referred to as an "irregular region A". In the outer peripheral surface S1, the irregular region A preferably exists over the entire circumference of the outer periphery with a predetermined width W in the length direction of the soft tube 1. As long as the entire irregular region A has an Sdq in the range of 0.03 to 0.50, the irregular region A may be composed of a single region with irregularities having an Sdq in the range of 0.03 to 0.50, or a plurality of regions with different types of irregularities each having an Sdq in the range of 0.03 to 0.50.

The predetermined width W is not particularly limited as long as the sheet conveying performance is secured. When the outer peripheral surface S1 of the soft tube 1 has a region outside the predetermined width W, the region may be a flat region without irregularities.

As used herein, the irregular region refers to a region with irregularities that are visually recognizable by a 10-fold microscope observation.

The Sdq in the irregular region A is from 0.03 to 0.50. When the Sdq is within the above range, a sheet conveying roller using the soft tube can exhibit the sheet conveyance performance at a level that is practically acceptable, and it is possible to reduce irregularity scraping in the manufacture thereof. From the viewpoint of developing the advantageous effects of the present invention more remarkably, the Sdq is preferably in the range of 0.30 to 0.44.

Sdq is a parameter related to the slope of the irregularities of an irregular shape, and a lower Sdq indicates the gentler slope of the irregularities. When the Sdq is excessively low, the intervals between the peaks are too long, which results in a decreased grip force or uneven grip. The sheet conveyance performance depends on the material and shape of the soft tube, the material of the sheet, and the like. However, the soft tube of the present invention can exhibit practically acceptable sheet conveyance performance for the following types of sheets.

As for the sheets suitable for the sheet conveying roller of the present invention, any types of sheets that are used as recording media in a multifunction peripheral (MFP) such as a multifunction printer can be used without particular limitation. Examples of such sheets include paper sheets such as coated paper (e.g. art paper, coated paper, lightweight coated paper, lightly coated paper, cast paper, etc.) and uncoated paper; plastic sheets made of resins such as polyester, polyvinyl chloride, polyethylene, polyurethane, polypropylene, acrylic resin, polycarbonate, polystyrene, acrylonitrile-butadiene-styrene copolymer, polyethylene terephthalate, and polybutadiene terephthalate; and sheets made of inorganic substances such as metals and glass.

The thickness, shape, and the like of the sheets are suitably selected according to the use of image-recorded matter obtained by the image forming method of the present invention.

The irregularity scraping depends on the hardness of the soft material of the soft tube. However, when the Sdq is equal to or less than the above-described upper limit, an undercut hardly occur regardless of the type of mold.

As described above, the Sa in the irregular region A is preferably in the range of 3.4 to 50.0 μm, more preferably in the range of 3.4 to 22.0 μm.

FIG. 3A shows a photograph (×18 magnification) of the irregular region A on the outer peripheral surface of an example of the embodiment of the soft tube of the present invention. In the irregular region A shown in FIG. 3A, the irregularities are randomly formed as a wrinkle pattern. In the soft tube of the present invention, the irregularities of the irregular region A have preferably such a random irregular shape. When the irregularities are random, it is possible to more efficiently reduce adhesion of paper dust and the like to the soft tube. In addition to the wrinkle pattern, examples of such random irregularities include leather patterns such as scale patterns, satin patterns, wood grain, rock grain, sand grain, cloth grain, silk grain and other fabric patterns, and irregular geometric patterns.

The above-described irregularities can be formed by a molding method using a mold. For example, the soft tube is molded using a mold in which the molding surface for the outer peripheral surface of the soft tube has a shape that is plane-symmetrical to the outer peripheral surface of the soft tube. In this case, the irregularities of the region of the mold corresponding to the irregular region A of the molding surface preferably has an Sdq of 0.03 to 0.50, preferably 0.30 to 0.44. Further, the irregularities of the region of the mold corresponding to the irregular region A of the molding surface has an Sa preferably in the range of 3.4 to 50.0 μm, more preferably in the range of 3.4 to 22.0 μm.

Figure 4A:
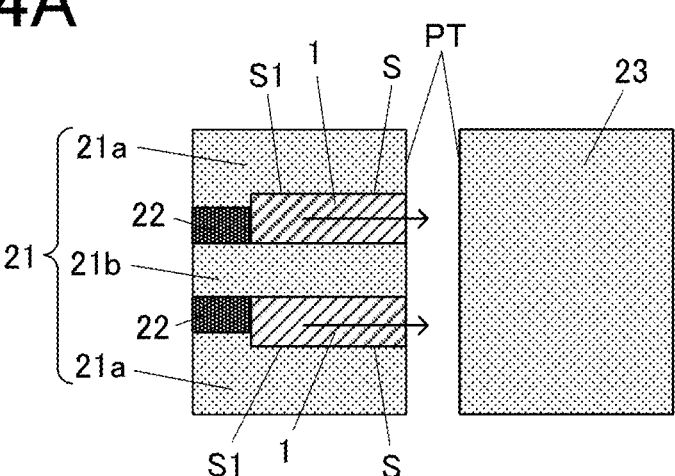
FIG. 4A is a cross-sectional view illustrating an example embodiment of the method for manufacturing the soft tube of the present invention.
Figure 4B:
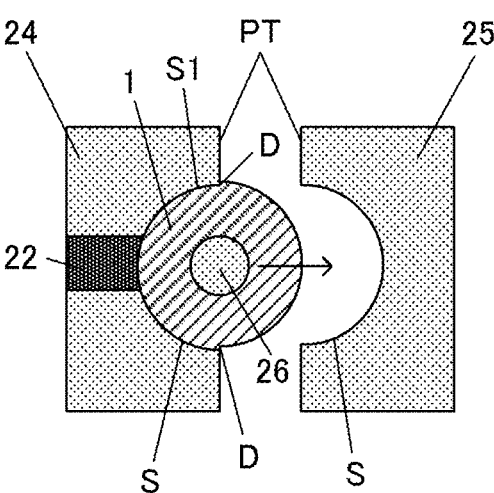
FIG. 4B is a cross-sectional view illustrating another example embodiment of the method for manufacturing the soft tube of the present invention.

In the method of releasing the mold in the radial direction as shown in FIG. 4B, which is described later, the soft tube 1 to be obtained has a parting line PL on the outer peripheral surface S1. The parting line PL corresponds to the seam (parting portion PT) of the mold and extends over the entire length in the longitudinal direction (see FIG. 4C). It is preferable that the soft tube 1 does not have a parting line on the outer peripheral surface S1 because there is a concern that the parting line may cause problems such as abnormal noise during sheet conveyance and damage to the sheet.

FIG. 3B is an enlarged cross-sectional view of the example embodiment of the soft tube of the present invention, illustrating the outer peripheral surface and the vicinity thereof. FIG. 3B illustrates a cross section of the irregular region A in which the irregularities are randomly arranged like the wrinkle pattern shown in FIG. 3A. For example, FIG. 3B is an enlarged view of the cross section of the soft tube shown in FIG. 1C taken along a plane orthogonal to the length direction, illustrating the outer peripheral surface and the vicinity thereof. In the irregular region A in which the irregularities are randomly arranged like the wrinkle pattern as shown in FIG. 3A, the similar random arrangement of the irregularities to that shown in FIG. 3B is also observed in the cross section taken along a plane parallel to the longitudinal direction of the soft tube as illustrated in FIG. 1D, which is an enlarged cross-sectional view illustrating the outer peripheral surface and the vicinity thereof.

As described above, the soft material of the soft tube 1 has, for example, an elongation (elongation rate) of 100% or more measured in accordance with JIS K6251. It is preferable that the soft material has rubber elasticity and is distorted when subjected to a stress but restores to substantially the original dimensions in a short time when released from the stress. Further, the soft material of the soft tube 1 preferably has a shore A hardness in the range of 40 to 85, more preferably in the range of 60 to 80.

When the shore A hardness is 40 or more, it is possible to further reduce the irregularity scraping in the manufacture of the soft tube. Further, it is possible to further reduce adhesion of paper dust and the like produced during sheet conveyance to the soft tube. When the shore A hardness is 85 or less, sufficient sheet conveyance performance can be secured.

Examples of the soft material of the soft tube 1 include a soft material mainly containing at least one material selected from conventionally known rubbers and thermoplastic elastomers, particularly those used for the sheet conveying portions of sheet conveying rollers. As the soft material of the soft tube, one of them may be used alone, or two or more of them may be used in combination. It is preferable that the soft tube 1 contains an thermoplastic elastomer as a constituent material.

Specific examples of such rubbers include butyl rubber, butadiene rubber, isoprene rubber, styrene butadiene rubber, chloroprene rubber, natural rubber, 1,2-polybutadiene, acrylonitrile-butadiene rubber, ethylene propylene rubber, acrylic rubber, chlorosulphonized polyethylene, and ethylene-propylene-diene rubber (EPDM) and the like.

Examples of such thermoplastic elastomers include styrene-based elastomers, chlorinated polyethylene, vinyl chloride-based elastomers, olefin-based elastomers, urethane-based elastomers, ester-based elastomers, amide-based elastomers, ionomers, ethylene vinyl acetate (EVA) and the like. From the viewpoint of Shore A hardness, styrene-based elastomers, olefin-based elastomers and the like are preferable.

As the thermoplastic elastomers, commercially available products can be used. Specific examples of the styrene-based elastomers include ARNESTON (registered trademark) CJ series and CE series (manufactured by Kuraray Plastics), and TEFABLOCK (registered trademark) (manufactured by Mitsubishi Chemical Corporation). Further, examples of the olefin-based elastomers include TREX-PLANE (trade name) (manufactured by Mitsubishi Chemical Corporation) and the like.

Further, as the soft material of the soft tube 1, a thermoplastic elastomer and a resin may be suitably mixed to prepare a soft material having a suitable hardness. Such resins include the same resins as those used as components of the following dynamically crosslinked thermoplastic elastomers. Polyolefin resins are preferable, and polypropylene is more preferable.

Further, a dynamically crosslinked thermoplastic elastomer may be used, in which a crosslinked rubber component is finely dispersed in either resin or thermoplastic elastomer or in a mixture of two or more of resins and thermoplastic elastomers. As the thermoplastic elastomer and the rubber component, the compounds exemplified above can be used.

Examples of resins used as the component of the dynamically crosslinked thermoplastic elastomer include polyolefin resins such as polyethylene and polypropylene, polyamide resins, polystyrene resins, acrylic resins such as polymethylmethacrylate, polyester resins such as polyethylene terephthalate and polybutylene terephthalate, and polyphenylene sulfide resins, polyphenylene oxide resins, polyphenylene ether resins, acrylonitrile-styrene resins, acrylonitrile-butadiene-styrene resins, polyacetal resins, fluorine resins and the like.

When the soft tube 1 is used as the sheet conveying portion of the sheet conveying roller, the soft tube 1 is, for example, disposed around the shaft 2 such that the inner peripheral surface S2 of the soft tube 1 is in contact with the outer peripheral surface S3 of the shaft 2 as shown in FIG. 2. In order for the soft tube 1 to rotate with the shaft 2, it is required that the contact surfaces between the two, i.e. the outer peripheral surface S3 of the shaft 2 and the inner peripheral surface S2 of the soft tube 1 is in a close contact state. It is preferable that the contact surfaces are bonded to each other by an adhesive or melt-joined to each other by thermal fusion or the like.

In order to achieve good adhesion at the interface, it is preferable that the shaft 2 is composed of a resin-based material and that the outer peripheral surface S3 of the shaft 2 and the inner peripheral surface S2 of the soft tube 1 are melt-joined to each other by thermal fusion. Considering the conditions for the melt joining, the SP of the material of the soft tube 1 is preferably close to the SP of the material of the shaft 2. Specifically, the difference between the two values is preferably within 1 $(cal/cm^3)^{1/2}$.

In the sheet conveying roller 10 shown in FIG. 2, two soft tubes 1 are disposed on one shaft 2 with a space so that the outer ends of the soft tubes 1 are located at the same distance from the respective ends of the shaft 2. The shaft 2 is designed such that, for example, the length is longer than the width (length in the direction perpendicular to the conveying direction) of the sheet P to be conveyed. Further, the two soft tubes 1 are disposed so that the outer ends are located inside the edges in the width direction of the sheet P.

In the sheet conveying roller 10, the number and arrangement of the soft tubes 1 are not limited to those shown in FIG. 2. For example, a single soft tube 1 may be disposed on the outer peripheral surface S3 of the shaft 2 such that both ends thereof are located inside both ends of the shaft 2. Alternatively, three or more soft tubes 1 may be disposed on the outer peripheral surface S3 of the shaft member 2 at equal intervals. When multiple soft tubes 1 are used for one shaft 2, the soft tubes 1 have the same inner diameter φ1 and outer diameter φ2 but may have different lengths L.

With respect to the size of the soft tube 1, the lower limit of the length L depends on the type (material and size) of the sheet P, but is preferably 10 mm from the viewpoint of ensuring the sheet conveyance performance. The upper limit of the length L of the soft tube 1 is selected suitably according to the design of the sheet conveying roller 10 as described above. The inner diameter φ1 of the soft tube 1 is the same as the outer diameter of the shaft 2, and can be typically within the range of 4 to 16 mm. The outer diameter φ2 of the soft tube 1 is determined by the wall thickness $T=(φ2-φ1)/2$ and the inner diameter φ1. The thickness T of the soft tube 1 is selected depending on the type of sheet P and the type of the soft material of the soft tube 1, but can be typically within the range of 1 to 3 mm from the viewpoint of ensuring the sheet conveyance performance.

From the viewpoint of sheet conveyance performance, it is preferred that the outer diameter φ2 and the wall thickness T of the soft tube 1 are uniform in the length direction. Furthermore, it is preferable that the wall thickness T is uniform also in the circumferential direction.

The outer peripheral surface S1 of the soft tube 1 is configured as described above. The inner peripheral surface S2 of the soft tube 1 is preferably shaped to ensure the close contact with the outer peripheral surface S3 of the shaft 2. However, in the manufacturing method that involves inserting the soft tube 1 in the mold and thereafter molding and melt-joining the shaft 2, the inner peripheral surface S2 of the soft tube 1 contacts and melt-joints to the outer peripheral surface S3 of the shaft 2 regardless of the shape of the inner peripheral surface S2 of the soft tube 1, whereby the close contact is ensured.

(Method for Manufacturing Soft Tube)

The soft tube of the present invention is manufactured by any particular method as long as it is manufactured so as to have the irregular region A on the outer peripheral surface. The manufacturing method using a mold is preferable, and injection molding or compression molding is more preferable, since the advantageous effect of the present invention of reducing irregularity scraping in the manufacture thereof is remarkable.

FIG. 4A and FIG. 4B are cross-sectional views of an example embodiment of the method for manufacturing the soft tube of the present disclosure. FIG. 4A illustrates an example of the method for manufacturing the soft tube using a mold that is configured to release the soft tube 1 in the length direction (axial direction). FIG. 4B illustrates an example of the method for manufacturing the soft tube using a mold that is configured to release the soft tube 1 in a radial direction.

Specifically, FIG. 4A illustrates the example in which a movable mold half 21 composed of an outer mold 21*a* and an inner mold 21*b* and a fixed mold half 23 are used to mold the soft tube 1 by injection molding, and then the soft tube 1 is released from the movable mold half 21 in the length direction.

In the example of FIG. 4A, the movable mold half 21 and the fixed mold half 23 are put together, and the constituent material of the flexible tube 1, which is a thermoplastic elastomer for example, is injected into the molding portion for the flexible tube 1 of the movable mold half 21 through a sprue (not shown) communicated to the molding portion. During the injection, the thermoplastic elastomer is in a flowable state by being heated.

The molding surface S of the outer mold 21*a* has irregularities that are plane-symmetrical to the irregularities of the irregular region A in the outer peripheral surface S1 of the soft tube 1. During the injection of the thermoplastic elastomer, the movable mold half 21 and the fixed mold half 23 are heated to a temperature at which flow of the thermoplastic elastomer is not prevented and which is equal to or below the solidification temperature of thermoplastic elastomer. The heating temperature of the thermoplastic elastomer and the mold depends on the type of thermoplastic elastomer. The injection speed and pressure are selected suitably. For example, the injection speed is preferably 2-5 mm/second, and the pressure is preferably maintained at 10-30 MPa. The retention time is preferably about 2 to 5 seconds.

Thereafter, the movable mold half 21 and the fixed mold half 23 are cooled to around room temperature, and after the shape of the soft tube 1 is fixed, the movable mold half 21 and the fixed mold half 23 are separated from each other. The cooling time is preferably 20 seconds or more. This state is illustrated in FIG. 4A. In FIG. 4A, the reference signs 22 indicate ejector pins. By pushing the ejector pins 22 out in the length direction (axial direction) of the soft tube 1 as indicated by the arrows, the soft tube 1 is released. The pushing speed of the ejector pins is preferably 1 to 5 mm/sec, more preferably 1.5 to 4 mm/sec.

Before the release, the outer mold 21*a* and the soft tube 1 are fitted to each other at the molding surface S of the outer mold 21*a* and the outer peripheral surface S1 of the soft tube 1. However, no undercut occurs in the irregular region A of the outer peripheral surface S1 of the soft tube 1 since the irregularities are readily elastically deformed during the release when the Sdq is within the above range. Accordingly, the occurrence of irregularity scraping can be reduced.

FIG. 4B illustrates the example in which a soft tube 1 is molded by injection molding using a movable mold half 24, a fixed mold half 25 and an inner mold 26, and then the soft tube 1 is released from the movable mold half 24 in the radial direction.

In the example of FIG. 4B, the movable mold half 24, the fixed mold half 25, and the inner mold 26 are put together, and the constituent material of the flexible tube 1*a*, which is a thermoplastic elastomer for example, is injected into the molding portion through a sprue (not shown) communicated to the molding portion of the flexible tube 1. During the injection, the thermoplastic elastomer is in a flowable state by being heated.

The molding surfaces S of the movable mold half 24 and the fixed mold half 25 have irregularities that are plane-symmetrical to the irregularities of the irregular region A in the outer peripheral surface S1 of the soft tube 1. During the injection of the thermoplastic elastomer, the movable mold half 21 and the fixed mold half 23 are heated to a temperature at which flow of the thermoplastic elastomer is not prevented and which is equal to or below the solidification temperature of thermoplastic elastomer. The heating temperature of the thermoplastic elastomer and the mold depends on the type of thermoplastic elastomer. The injection speed and pressure are selected suitably. For example, the injection speed is preferably 2 to 5 mm/second, and the pressure is preferably maintained at 10 to 30 MPa. The retention time is preferably about 2 to 5 seconds.

Thereafter, the movable mold half 24, the fixed mold half 25, and the inner mold 26 are cooled to around room temperature. After the shape of the soft tube 1 is fixed, the movable mold half 24 and the fixed mold half 25 are separated from each other. The cooling time is suitably selected. The cooling time is preferably 20 seconds or more. This state is illustrated in FIG. 4B. Before the separation, the fixed mold half 25 and the soft tube 1 are fitted to each other at the molding surface S of the fixed mold half 25 and the outer peripheral surface S1 of the soft tube 1. However, since the Sdq is within the above range, the irregularities are readily elastically deformed during separating the mold. Accordingly, no undercut occurs in the irregular region A of the outer peripheral surface S1 of the soft tube 1, and the occurrence of irregularity scraping can thus be reduced.

In FIG. 4B, the reference sign 22 indicates an ejector pin. By pushing the ejector pin 22 in the radial direction of the soft tube 1 as indicated by the arrow, the soft tube 1 is released. The pushing speed of the ejector pin is preferably 1 to 5 mm/sec.

The inner mold 26 is pulled out of the soft tube 1 by, for example, as a sliding core. Before the release, the movable mold half 24 and the soft tube 1 are fitted to each other at the molding surface S of the movable mold half 24 and the outer peripheral surface S1 of the soft tube 1. However, since the Sdq is within the above range, the irregularities are readily elastically deformed during the release. Accordingly, no undercut occurs in the irregular region A of the outer peripheral surface S1 of the soft tube 1, and the occurrence of irregularity scraping can thus be reduced.

Figure 4C:
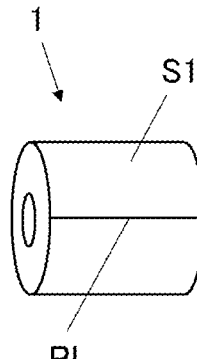
FIG. 4C is a perspective view illustrating a parting line of a soft tube.

As illustrated in FIG. 4B, it is inevitable that an misalignment occurs at the parting portions PT of the movable mold half 24 and the fixed mold half 25 due to processing errors. This misalignment results in the steps D formed in the outer peripheral surface S1 of the soft tube 1 at the portions corresponding to the parting portions PT. The steps D are formed in a line shape along the two parting portions PT of the movable mold half 24 and the fixed mold half 25, respectively, over the entire length of the outer peripheral surface S1 of the soft tube 1, which become parting lines. FIG. 4C illustrates a perspective view of the soft tube 1 having the parting lines PL thus formed. Although not illustrated in FIG. 4C, this soft tube 1 has one more similar parting line PL at the back.

It is preferred that the soft tube 1 does not have a parting line PL. For this reason, in the present invention, it is preferable to mold the soft tube 1 by using a mold that is configured to release the soft tube 1 in the length direction (axial direction).

(Sheet Conveying Roller)

The sheet conveying roller of the present invention includes a shaft and a tubular sheet conveying portion disposed on the outer peripheral surface of the shaft, and the sheet conveying portion includes the soft tube of the present disclosure.

The sheet conveying roller of the present invention includes the shaft and the sheet conveying portion as essential components. Using the sheet conveying roller 10 shown in FIG. 2 as an example, the soft tube 1, which is one of the essential components of the sheet conveying roller 10, has been described. Hereinafter, the shaft 2, which is another essential component of the sheet conveying roller 10, will be described.

As described above, the shaft 2 is configured such that the outer peripheral surface S3 thereof is in close contact with the inner peripheral surface S2 of the soft tube 1. Accordingly, when the shaft 2 is rotated in the circumferential direction, the soft tube 1 also is also rotated in the circumferential direction at the same time. The shaft 2 is configured to support and rotate the soft tube 1 so that the sheet P can be conveyed as described above.

The material of the shaft 2 is not particularly limited as long as the above-described functions are achieved. Specifically, such materials include various metals and resins having moderate rigidity. Specifically, materials having a bending modulus in accordance with JIS K7171 of generally 1200 (N/mm$^2$) or more are preferred. Considering the contact with the soft tube 1, the shaft 2 is preferably made of resin.

The shaft 2 is preferably melt-joined to the soft tube 1 by thermal fusion or the like. In order to improve the joining strength by the melt joining, as described above, the SP of the soft material of the soft tube 1 is preferably close to the SP of the material of the shaft member 2. Specifically the difference between them is preferably 1 (cal/cm$^3$)$^{1/2}$ or less.

From the viewpoint of the above-described SP, examples of the material of the shaft 2 include the same resins as those used as a component of the above-described dynamic cross-linked thermoplastic elastomer. According to the SP of the material of the soft tube 1, the material of the shaft 2 can be suitably selected from materials having an SP that satisfies the above condition.

Specific examples of resins that are preferably used as the material of the shaft 2 include polyolefin resins such as polypropylene, polyacetal resins, and polycarbonate resins. From the viewpoints of environment and cost, polypropylene is more preferable. As used herein, the term "polypropylene" refers to a (co)polymer in which propylene is used as a main component of raw material monomers, for example, in the amount of 50 mol % or more. The other resins are defined similarly.

Commercial products of the above-described resins can be used. Specific examples of such polypropylene include PP-R200 (manufactured by Kinhatsu Technology) and various grades of NOVATECH (registered trademark) PP, such as BC3AD (manufactured by Nippon Polypro).

The shaft 2 preferably has a cylindrical shape. As long as the portion of the shaft member 2 having the soft tube 1 on the outer peripheral surface S3 is cylindrical, the other portions do not necessarily have to be cylindrical. According to need, the portion not having the soft tube 1 may have a cross-sectional shape taken along a plane perpendicular to the length direction of the shaft 2 of a polygon, a star, a circle with a different diameter from that of the portion having the soft tube 1, or the like.

With respect to the size of the shaft 2, at least the portion of the shaft 2 having the soft tube 1 has an outer diameter that is the same as the inner diameter φ1 of the soft tube 1 and that can be typically within the range of 4 to 16 mm. The outer diameter of the shaft 2 can be, for example, about 4 to 16 mm over the entire length. The length of the shaft 2 is suitably selected according to the size of the sheet to be conveyed.

When the shaft 2 is made of resin, the shaft 2 can be molded by, for example, extrusion molding, injection molding, compression molding or the like. In the method for manufacturing the sheet conveying roller of the present invention described below, injection molding is employed.

The sheet conveying roller 10 is installed and used, for example, in a sheet feeder or the like of a multifunction printer. In the sheet feeder, both ends of the shaft 2 are mounted on bearings, and at least one end is connected to a drive unit. Further in the sheet feeder, for example, a roller, which is a cylindrical rolling element, is disposed opposite the soft tube 1 as the sheet conveying portion and pressed against the soft tube 1 to the extent that the sheet (paper) can be conveyed. The soft tube 1 and the roller are arranged so that their longitudinal directions (axial directions) are parallel to each other. The sheet (paper) is nipped between the soft tube 1 and the roller. Along with the circumferential rotation of the shaft 2, the soft tube 1 is rotated, and the sheet (paper) is conveyed by the rotation.

(Method for Manufacturing Sheet Conveying Roller)

The sheet conveying roller of the present invention can be manufactured, for example, by arranging the soft tube at a predetermined position in the length direction of the shaft so that the outer peripheral surface of the shaft and the inner peripheral surface of the soft tube are in close contact with each other. The close contact between the outer peripheral surface of the shaft and the inner peripheral surface of the soft tube may be achieved, for example, by bonding with an adhesive or the like, or by melt joining such as thermal fusion. The sheet conveying roller of the present invention is preferably manufactured by the manufacturing method of the present invention described below.

The method for manufacturing the sheet conveying roller of the present invention involves the following steps (1) to (3).

(1) Molding the above-described soft tube of the present invention.

(2) Inserting the soft tube to a holding portion of a mold having the holding portion for holding the soft tube and a molding portion for molding a shaft such that the shaft is in contact with the inner peripheral surface of the soft tube.

(3) Molding the shaft in the molding portion of the mold.

For Step (1), the above-described method for manufacturing the soft tube of the present invention can be employed. Hereinafter, Step (2) and Step (3) will be described referring to the drawings.

Figure 5A:
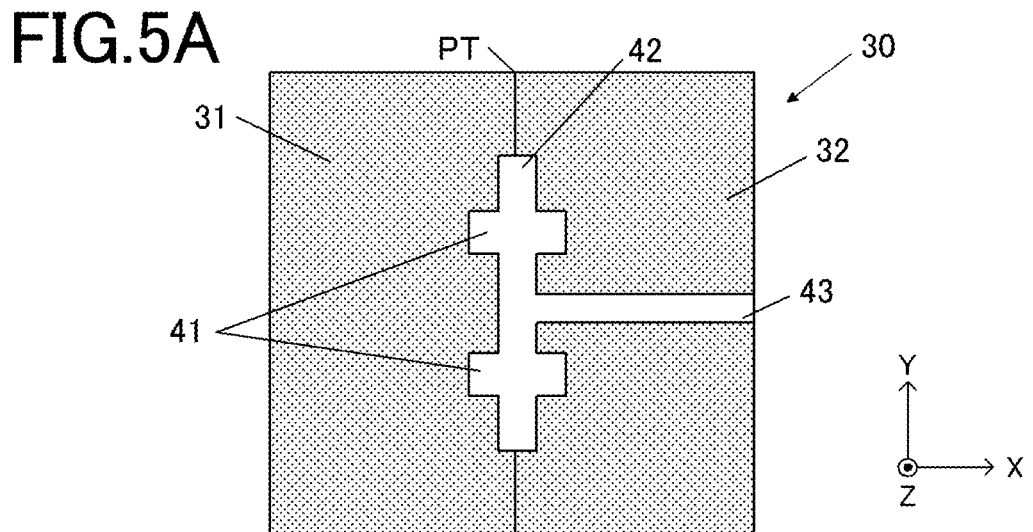
FIG. 5A is a cross-sectional view of a mold that is used in an example embodiment of the method for manufacturing the sheet conveying roller of the present invention.
Figure 5B:
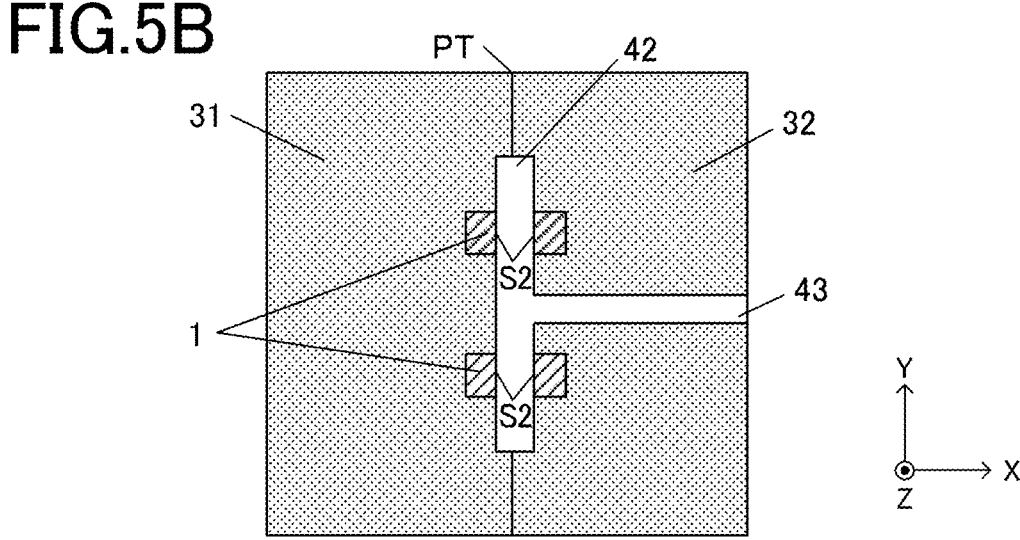
FIG. 5B is a cross-sectional view illustrating a state after the soft tube is inserted in the example embodiment of the method for manufacturing the sheet conveying roller of the present invention.
Figure 5C:
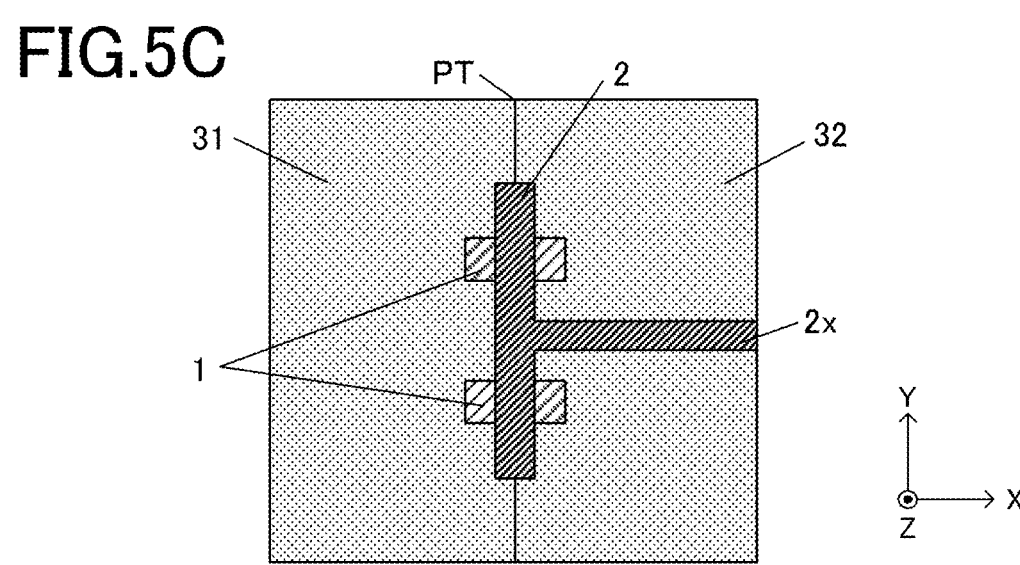
FIG. 5C is a cross-sectional view illustrating a state after the shaft is molded in the example embodiment of the method for manufacturing the sheet conveying roller of the present invention.

FIG. 5A, FIG. 5B, and FIG. 5C show a cross-sectional view of a mold 30 used in an example embodiment of the method for manufacturing the sheet conveying roller of the present invention, a cross-sectional view of the mold 30 in which the soft tube 1 is inserted, illustrating the state after Step (2), and a cross-sectional view of the mold 30 including the soft tube 1 and the shaft member 2, illustrating the state after Step (3).

The mold used in the manufacturing method of the present invention will be described using the mold 30 shown in FIG. 5A as an example, but the mold is not limited thereto. The mold 30 shown in FIG. 5A includes, for example, a first mold 31 and a second mold 32 which can be separated in the X direction at a parting portion PT or the like.

When the first mold 31 and the second mold 32 of the mold 30 are put together, the mold 30 has holding portions 41 for holding the soft tubes 1 and a molding portion 42 for molding the shaft 2 such that the shaft 2 is in contact with the inner peripheral surfaces S2 of the soft tubes 1 held at the holding portion 41. The mold 30 further has a resin injection channel 43 that communicates the molding portion 42 to the outside of the mold 30. The mold 30 has two holding portions 41 and can be used, for example, as a mold for molding the sheet conveying roller 10 shown in FIG. 2. In this case, the holding portions 41 for holding the soft tubes 1 are provided at two locations corresponding to the positions of the soft tubes 1 of the sheet conveying roller 10.

The resin injection channel 43 is provided so that resin, which is the constituent material of the shaft member 2, can be injected into the molding portion 42 through an opening to the outside of the mold 30.

In Step (2), for example, with only the first mold 31 separated from the mold 30, the soft tube 1 is inserted into the two holding portions 41. The holding portions 41 have the same size and shape as the outer circumference of the soft tubes 1 so that the soft tubes 1 do not move during Step (3). The irregularities of the irregular region A in the outer peripheral surface S1 of the soft tubes 1 is preferably at which such melt joining is possible. However, the temperature of the resin and the mold is controlled to a temperature at which the irregularities in the irregular region A of the outer periphery S1 of the soft tube 1 can be maintained.

In Step (3), the mold 30 with a molded product inside is cooled to the solidification temperature of the resin or less. After the shape of the molded product is fixed, the first mold 31 and the second mold 32 are separated from each other. The cooling time is suitably selected. The cooling time is preferably 20 seconds or more. As shown in FIG. 5C, the molded product has two soft tubes 1 on one shaft 2. For example, the molded product is the sheet conveying roller 10 shown in FIG. 2 with a resin member 2X molded in the shape of the resin injection channel 43. After the molded product is released from the mold 30, the resin member 2X is cut off so that the sheet conveying roller 10 is obtained.

EXAMPLES

Hereinafter, the present invention will be specifically described with reference to examples, but the present invention is not limited thereto.

(Manufacture of Soft Tube)

Soft tubes 1 to 11 were manufactured under the following conditions by using the styrene-based thermoplastic elastomers shown in Table 1 below as the thermoplastic elastomer.

TABLE 1

| Abbreviation of thermoplastic elastomer | Type | Product name | Manufacturer | Shore A hardness | SP value $(cal/cm^3)^{1/2}$ |
|---|---|---|---|---|---|
| E1 | Styrene-based | EARNESTON CJ003 | Kuraray Plastics Co., Ltd. | 80 | 7.9-8.2 |
| E2 | Styrene-based | EARNESTON CJ001 | Kuraray Plastics Co., Ltd. | 40 | 7.9-8.2 |
| E3 | Styrene-based | EARNESTON CJ002 | Kuraray Plastics Co., Ltd. | 60 | 7.9-8.2 |
| E4 | Styrene-based | Mixture of EARNESTON CJ003 and NOVATEC-PP BC3AD (Japan Polypropylene Corp.), blend ratio (by mass) = 95:5 | | 85 | 7.9-8.2 | maintained even after Step (3). However, in Step (3), it is usually not necessary to form the surfaces of the holding portions 41 in any special shape, because the irregularities can be maintained even when the holding portions 41 do not have the irregular shape corresponding to the outer peripheral surface S1 of the soft tubes 1. When the first mold 31 is aligned with the second mold 32 at the parting portion PT after inserting the soft tubes 1, the mold 30 becomes the state as illustrated in the cross section of FIG. 5B.

In Step (3), the constituent material of the shaft 2, which is resin, is injected through the opening of the resin injection channel 43 and transferred to the molding portion 42 so that the molding portion 42 is filled with the resin. In this step, the resin is in a flowable state by heat. During injection of the resin, the first mold 30 and the second mold 31 are heated to a temperature at which flow of the resin is not interfered and which is equal to or less than the solidifying temperature of the resin. The heating temperature of the resin and the mold depends on the type of resin. The injection speed and pressure are selected suitably. For example, the injection speed is preferably 30 to 70 mm/second, and the pressure is preferably maintained at 50 to 70 MPa. The retention time is preferably about 5 to 20 seconds.

In Step (3), by controlling the temperature of the resin and the mold, it is possible to join the inner peripheral surface S2 of the soft tube 1 and the outer peripheral surface S3 of the shaft 2 to each other by melt joining. In the manufacturing method of the present invention, it is preferable to control the temperature of the resin and the mold to a temperature The soft tubes were injection-molded using a mold to have a cylindrical shape and a size with an outer diameter of 16 mm, an inner diameter of 12 mm, and a length of 10 mm.

As for the mold, molds A to G were used, which were configured such that a soft tube as illustrated in FIG. 4A is released in the longitudinal direction, and which had different molding surfaces S. Soft tubes 1 to 11 were manufactured using the molds and thermoplastic elastomers shown in Table II under the following molding conditions 1 to 3. Molding condition 1 was as follows. Thermoplastic elastomer temperature: 210° C., mold temperature: 40° C., injection speed: 5 mm/sec, cooling time: 35 seconds, holding pressure: 15 MPa, and ejector pin projection speed: 1.5 mm/sec. Molding conditions 2 and 3 were the same as the molding condition 1 except that the ejector pin projection speed was 3.0 mm/sec and 4.5 mm/sec, respectively.

(Measurement of Irregularities on Outer Peripheral Surface)

The irregularities of the outer peripheral surface of each soft tube was measured by measuring the irregularities of the molding surfaces of the molds A to G used in the manufacture of the soft tube. The entire molding surface of each mold had a random irregular shape.

The Sa and Sdq of the irregularities of the molding surfaces of molds A to G were determined by measuring the irregularities of flat plates that were processed under the same conditions as those for the molding surfaces of molds A to G. Five measurement areas each having a size of 2.3 mm×1.7 mm were randomly selected. Using a three-dimensional white light interferometric microscope (WYKO, manufactured by Burka Japan), Sdq and Sa were measured in each measurement area by the method described above, and the average values of Sdq and Sa in the five measurement areas were calculated. The results are shown in Table 2.

In the soft tubes 1 and 2, which are comparative examples, the occurrence of irregularity scraping was observed in the following evaluations. Therefore, the Sdq and Sa values listed in the column of irregularity shape in Table II indicate the Sdq and Sa of the molding surfaces of the molds but do not reflect the irregularities of the outer peripheral surface of the soft tubes 1 and 2. As for the soft tubes 3 to 11, which are examples of the present invention, Sdq and Sa values listed in the column of irregularity shape in Table II indicate not only the Sdq and Sa of the molding surfaces of the molds but also the Sdq and Sa of the outer peripheral surfaces of the soft tubes 3 to 11.

(Evaluation of Irregularity Scraping)

For the soft tubes 1 to 11, irregularity scraping during the manufacture was evaluated according to the following criteria. The irregularity scraping was visually determined. If the irregularities of the outer surface was scraped even slightly, it was considered that "irregularity scraping occurred". The results are shown in Table 2.

(Evaluation Criteria)

AA: No irregularity scraping occurred under any of the molding conditions 1 to 3.

BB: Irregularity scraping occurred under only the molding condition 3. That is, irregularity scraping is preventable depending on the molding conditions.

CC: Irregularity scraping occurred under all of the molding conditions 1 to 3.

(Manufacture of Sheet Conveying Roller)

A sheet conveying roller having two soft tubes on a single shaft as illustrated in FIG. 2 was manufactured by injection molding according to the manufacturing method of the present invention, in which polypropylene (PP-R200 (Kingfa SCI & TECH. Co., Ltd.), SP=8.1 (cal/cm$^3$)$^{1/2}$) was used as the material of the shaft, and the mold as illustrated in FIG. 5A was used.

The soft tubes 1 to 11 obtained under the above-described molding conditions 1 were used to manufacture the sheet conveying rollers 1 to 11. The shaft had an outer diameter of 12 mm and a length of 220 mm.

Specifically, in the manufacture of the sheet conveying roller 1, the mold was separated, and two soft tubes 1 were inserted to the two holding portions. Thereafter, the three parts of the mold was put together so as to be in the state as illustrated in the cross-sectional view of FIG. 5B. Thereafter, the above-described polypropylene, which is the constituent material of the shaft 2, was transferred to the molding portion 42 through the opening of the resin injection channel 43 to fill the molding portion 42 with the polypropylene, so that the shaft was molded. The molding conditions were as follows. Resin temperature: 210° C., mold temperature: 50° C., injection speed: 70 mm/sec, cooling time: 50 sec, and holding pressure: 50 MPa. After molding, the molded product was released from the mold, and unnecessary parts were cut off. The sheet conveying roller 1 was thus obtained.

The sheet conveying rollers 2 to 11 were manufactured in the same manner except that the soft tubes 1 were changed to the soft tubes 2 to 11.

(Evaluation of Paper Dust Adhesion)

Each of the sheet conveying rollers 1 to 11 was installed to a sheet feeder of a multifunction printer (manufactured by Konica Minolta). A sheet of paper (Konica Minolta CF paper A4) was conveyed 100 times so that paper dust adhered to the soft tubes. Thereafter, five sheets of paper (Konica Minolta CF paper A4) with solid process blue (cyan+ magenta) printed on the entire sheet were conveyed, and it was checked whether the paper dust re-adhered to the sheets. The adhesion of paper dust was visually checked and evaluated according to the following criteria. The results are shown in Table 2.

(Evaluation Criteria)

a: No paper dust adhesion. The sample can be used for a roller that is easily affected by paper dust adhesion.

b: Paper dust adhesion occurred. The sample can be used for a roller that is less likely to be affected by paper dust adhesion.

(Evaluation of Paper Conveying Performance)

Each of the above-described sheet conveying rollers 1 to 11 was installed to a sheet feeder of a multifunction printer (manufactured by Konica Minolta). A piece of paper (Konica Minolta CF paper, cut into 2 cm in width and 29.7 cm in length) was nipped between the soft tube and a roller such that the width direction of the piece of paper is in the length direction of the soft tube. The piece of paper was pulled out in the longitudinal direction, and the pulling force was measured by a push-pull force gauge. The sheet conveying performance was evaluated from the measured value of the pulling force according to the following criteria. The results are shown in Table 2.

(Evaluation Criteria)

AA: The pulling force was 2.5 N or more. The sheet conveying performance is sufficient.

BB: The pulling force was 2.0 N or more and below 2.5 N. The sheet conveying performance is within standards.

CC: The sheet pulling force was less than 2.0 N. The sheet conveying performance is insufficient.

TABLE 2

| Soft tube | Sheet conveying roller | Molding surface of mold | Thermoplastic elastomer | Shore A hardness | Shape of irregularities Sdq | Shape of irregularities Sa(μm) | Irregularity scraping | Paper dust adhesion | Paper conveying property | Remarks |
|---|---|---|---|---|---|---|---|---|---|---|
| 1 | 1 | A | E1 | 80 | 0.56 | 0.3 | CC | b | CC | Comparative |
| 2 | 2 | B | E1 | 80 | 0.54 | 22.0 | CC | b | CC | Comparative |
| 3 | 3 | C | E1 | 80 | 0.50 | 3.4 | BB | a | AA | Inventive |
| 4 | 4 | D | E1 | 80 | 0.44 | 14.8 | AA | a | AA | Inventive |
| 5 | 5 | E | E1 | 80 | 0.30 | 0.3 | AA | b | AA | Inventive |
| 6 | 6 | F | E1 | 80 | 0.03 | 15.0 | AA | a | AA | Inventive |
| 7 | 7 | G | E1 | 80 | 0.42 | 50.0 | AA | b | AA | Inventive |
| 8 | 8 | D | E2 | 40 | 0.44 | 14.8 | AA | a | AA | Inventive |

TABLE 2-continued

| Soft tube | Sheet conveying roller | Molding surface of mold | Thermoplastic elastomer | Shore A hardness | Shape of irregularities | | Irregularity scraping | Paper dust adhesion | Paper conveying property | Remarks |
|---|---|---|---|---|---|---|---|---|---|---|
| | | | | | Sdq | Sa(μm) | | | | |
| 9 | 9 | D | E3 | 60 | 0.44 | 14.8 | AA | a | AA | Inventive |
| 10 | 10 | D | E1 | 80 | 0.44 | 14.8 | AA | a | AA | Inventive |
| 11 | 11 | D | E4 | 85 | 0.44 | 14.8 | AA | a | BB | Inventive |

It can be seen from Table 2 that irregularity scraping in the manufacture was reduced in the soft tubes of the present invention. Further, it can also be seen that the preferred embodiments exhibited reduced paper dust adhesion and acceptable sheet conveying performance.

What is claimed is:

1. A soft tube of a sheet conveying portion of a sheet conveying roller, the soft tube comprising:
   a region with irregularities in an outer peripheral surface of the soft tube, the region having a three-dimensional root mean square slope (Sdg) within a range of 0.30 to 0.44, an arithmetic mean height (Sa) within a range of 3.4 to 22.0 μm, and a Shore A hardness at 25° C. within a range of 40-80;
   wherein the irregularities have a random shape;
   wherein the soft tube includes a first portion of a tube circumference within a predetermined axial width of the tube including the region with irregularities and a second portion of the tube length outside of the predetermined axial width that is flat.

2. The soft tube according to claim 1, wherein there is no parting line on the outer peripheral surface.

3. The soft tube according to claim 1, wherein the soft tube contains a thermoplastic elastomer as a constituent material.

4. The soft tube of claim 1, wherein the irregularities are arranged one or more of a wrinkle pattern, a leather pattern, a scale pattern, a satin pattern, a wood grain pattern, a rock grain pattern, a sand grain pattern, a cloth grain pattern, and a silk grain pattern.

5. A method for manufacturing a soft tube of a sheet conveying portion of a sheet conveying roller, the method comprising:
   molding the soft tube by injection molding or compression molding,
   wherein the soft tube comprises:
   a region with irregularities in an outer peripheral surface of the soft tube, the region having a three-dimensional root mean square slope (Sdg) within a range of 0.30 to 0.44, an arithmetic mean height (Sa) within a range of 3.4 to 22.0 μm, and a Shore A hardness at 25° C. within a range of 40-80;
   wherein the irregularities have a random shape;
   wherein the soft tube includes a first portion of a tube circumference within a predetermined axial width of the tube including the region with irregularities and a second portion of the tube length outside of the predetermined axial width that is flat.

6. A sheet conveying roller, the roller comprising:
   a shaft and
   a tubular sheet conveying portion disposed on an outer peripheral surface of the shaft,
   wherein the sheet conveying portion includes a soft tube, the soft tube comprising:
   a region with irregularities in an outer peripheral surface of the soft tube, the region having a three-dimensional root mean square slope (Sdg) within a range of 0.30 to 0.44, an arithmetic mean height (Sa) within a range of 3.4 to 22.0 μm, and a Shore A hardness at 25° C. within a range of 40-80, wherein the irregularities have a random shape, wherein the soft tube includes a first portion of a tube circumference within a predetermined axial width of the soft tube including the region with irregularities and a second portion of the soft tube length outside of the predetermined axial width that is flat.

7. The sheet conveying roller according to claim 6, wherein a difference in solubility parameter SP between a constituent material of the soft tube and a constituent material of the shaft is equal to or less than 1 $(cal/cm^3)^{1/2}$.

8. A method for manufacturing a sheet conveying roller, the sheet conveying roller comprising a shaft and a tubular sheet conveying portion disposed on an outer peripheral surface of the shaft, wherein the sheet conveying portion includes a soft tube, the method comprising:
   molding the soft tube, wherein the soft tube comprises a region with irregularities in an outer peripheral surface of the soft tube, the region having a three-dimensional root mean square slope (Sdg) within a range of 0.30 to 0.44, an arithmetic mean height (Sa) within a range of 3.4 to 22.0 μm, and a Shore A hardness at 25° C. within a range of 40-80, wherein the irregularities have a random shape, wherein the soft tube includes a first portion of a tube circumference within a predetermined axial width of the soft tube including the region with irregularities and a second portion of the soft tube length outside of the predetermined axial width that is flat;
   providing a mold, the mold including a holding portion for holding the molded soft tube and a molding portion for molding the shaft such that the shaft is in contact with an inner peripheral surface of the soft tube;
   inserting the molded soft tube within the holding portion of the mold; and
   molding the shaft in the molding portion of the mold such that the soft tube within the holding portion and the molded shaft form the sheet conveying roller.

9. The method for manufacturing the sheet conveying roller according to claim 8, wherein the molding of the shaft includes joining the inner peripheral surface of the soft tube and an outer peripheral surface of the shaft to each other by melt joining.

* * * * *